United States Patent
Murakami et al.

(10) Patent No.: US 7,206,190 B2
(45) Date of Patent: Apr. 17, 2007

(54) ELECTRODE FOR ELECTRIC DOUBLE LAYER CAPACITOR

(75) Inventors: Kenichi Murakami, Wako (JP); Manabu Iwaida, Wako (JP); Shigeki Oyama, Wako (JP); Toshiaki Fukushima, Yao (JP); Tomohiko Kawaguchi, Yao (JP); Kouki Ozaki, Inuyama (JP); Masanori Tsutsui, Inuyama (JP)

(73) Assignees: Honda Motor Co., Ltd., Tokyo (JP); No-Tape Industrial Co., Ltd., Osaka (JP); Daido Metal Company Ltd., Nagoya (JP)

( * ) Notice: Subject to any disclaimer, the term of this patent is extended or adjusted under 35 U.S.C. 154(b) by 0 days.

(21) Appl. No.: 11/156,568

(22) Filed: Jun. 21, 2005

(65) Prior Publication Data

US 2005/0225929 A1    Oct. 13, 2005

Related U.S. Application Data

(62) Division of application No. 10/720,751, filed on Nov. 25, 2003, now Pat. No. 6,917,094.

(30) Foreign Application Priority Data

Nov. 29, 2002 (JP) ............................. 2002-348466
Nov. 29, 2002 (JP) ............................. 2002-348554

(51) Int. Cl.
*H01G 9/00* (2006.01)

(52) U.S. Cl. ..................... 361/502; 361/503; 361/504; 361/508; 361/512; 361/523; 29/25.01; 29/25.03

(58) Field of Classification Search ........ 361/502–504, 361/508–512, 516–519, 523–529; 29/25.03, 29/25.01

See application file for complete search history.

(56) References Cited

U.S. PATENT DOCUMENTS

| | | | | |
|---|---|---|---|---|
| 5,659,457 A | * | 8/1997 | Lian et al. | 361/502 |
| 5,953,204 A | * | 9/1999 | Suhara et al. | 361/502 |
| 6,058,006 A | * | 5/2000 | Yoshioka et al. | 361/511 |
| 6,064,561 A | * | 5/2000 | Harada et al. | 361/502 |
| 6,359,769 B1 | * | 3/2002 | Mushiake et al. | 361/502 |
| 6,454,816 B1 | * | 9/2002 | Lee et al. | 361/502 |
| 6,808,845 B1 | * | 10/2004 | Nonaka et al. | 361/502 |
| 2004/0114307 A1 | | 6/2004 | Oyama et al. | |

FOREIGN PATENT DOCUMENTS

| | | |
|---|---|---|
| JP | 05-082396 A | 4/1993 |
| JP | 7-201663 | 8/1995 |
| JP | 11-162787 | 6/1999 |

(Continued)

*Primary Examiner*—Nguyen T. Ha
(74) *Attorney, Agent, or Firm*—Arent Fox PLLC

(57) ABSTRACT

In an electrode for an electric double layer capacitor of the present invention, the peak value of particle size distribution of graphite particles added to a conductive adhesive is in a range of 2.6 to 3.2 μm, not less than 100,000 dimples having a largest outer diameter in a range of 4 to 10 μm and a depth in a range of 4 to 15 μm are formed on the surface of the collector sheet per 1 cm², and the occupied area of the dimples to the entire surface area of the collector sheet is not more than 50%. By determining the saponification value of polyvinylalcohol which is used as a binder component of the conductive adhesive in a range of 90.0 to 98.5, adhesiveness of the collector sheet and the electrode forming sheet is improved. Furthermore, by substituting H atoms contained in the polyvinylalcohol with Si atoms, adhesiveness of the collector sheet and the electrode forming sheet can be further improved.

2 Claims, 3 Drawing Sheets

FOREIGN PATENT DOCUMENTS

| | | | |
|---|---|---|---|
| JP | 11-238654 A | 8/1999 |
| JP | 11-279501 A | 10/1999 |
| JP | 2000082452 | * | 3/2000 |
| JP | 2000-269095 A | 9/2000 |
| WO | 99/31746 A1 | 6/1999 |

* cited by examiner

About 12 μm

ELECTRODE FOR ELECTRIC DOUBLE LAYER CAPACITOR

CROSS-REFERENCE TO RELATED APPLICATION

This application is a divisional application of application Ser. No. 10/720,751, filed Nov. 25, 2003 now U.S. Pat. No. 6,917,094 The disclosure of the prior application is hereby incorporated herein by reference in its entirety.

BACKGROUND OF INVENTION

1. Technical Field

The present invention relates to electrodes for electric double layer capacitors which are suitable for use for electric double layer capacitors having large capacity and high power.

2. Background Art

An electric double layer capacitor has characteristics such as long service life, high cycle characteristics, and characteristics of charge and discharge with heavy current since there are no chemical reactions during charge and discharge of the capacitor as there are in a conventional secondary battery. Therefore, this capacitor is attracting much attention as a new type of storage battery or as a driving power supply automobiles and devices. In particular, an electric double layer capacitor having large capacity and high power is being developed.

As a process for producing such an electric double layer capacitor, a method in which conductive adhesive is coated on a collector sheet, such as aluminum foil, and an electrode forming sheet is joined through this conductive adhesive, is known (see Japanese Unexamined Patent Application Publication No. 11-162787). In this method, activated carbon, conductive carbon, binder, and solvent are mixed and kneaded first, and the electrode forming sheet is obtained by rolling and drying. A conductive filler such as carbon black or graphite and a binder comprising a resin component such as polyvinyl alcohol (PVA) are mixed to prepare a conductive adhesive, and then the conductive adhesive is coated on the collector sheet and is joined with the electrode forming sheet and is dried.

It is known that carbon black, which has particles of small diameter, and graphite, which has particles of large diameter, are used together as this conductive filler in order to maintain adhesive strength by increasing contact surface area with small particles, and in order to maintain macro conductive paths with large particles (see Japanese Unexamined Patent Application Publication No. 7-201663.

Furthermore, since water-based solvent is used in the conductive adhesive using PVA in the above-mentioned process for production of the electrode for electric double layer capacitor, preparation is easy, it is not necessary to use harmful organic solvents, reducing environmental measures, the cost is low, and durability is superior.

However, there is a problem in that the initial resistance of the capacitor cannot be restrained only by using carbon black and graphite together, and there is also a problem in that adhesive strength is not improved. There are even cases in which efficiency is deteriorated. It should be noted that there is no description of the kind of carbon black and graphite which may be used in the above patent application publication. Furthermore, in the case in which it is used as a driving power source of a car, the temperature of the electrolyte is increased since the capacitor is used under severe conditions, and there is a problem of interface separation caused by deterioration of adhesive strength.

Furthermore, there is a problem in that a water based adhesive such as PVA may be easily affected by, for example, surface properties of adhering material or temperature, and adhesive strength may easily become unstable. If adhesive strength becomes unstable, the collector sheet and a layer comprising conductive adhesive (hereinafter referred to as a conductive adhesive layer) may be easily separated along the interface, and the interface resistance is increased while charging and discharging. In particular, in a case in which the capacitor is used as a driving power resource of a car, the temperature of the electrolyte is increased under severe conditions, and interface separation may easily occur.

SUMMARY OF THE INVENTION

The present invention was completed in view of the situation described above, and an object of the present invention is to provide an electrode for an electric double layer capacitor in which initial resistance of a cell can be restrained by optimizing the diameter of graphite particles which is the conductive filler of the conductive adhesive, and increase of resistance with aging can be restrained by maintaining adhesive strength. Furthermore, an object of the present invention is to provide an electrode for an electric double layer capacitor in which increasing of resistance can be restrained by improving adhesive property of the collector sheet and the electrode forming sheet of the electrode for electric double layer capacitor in which PVA is used as a resin component of the conductive adhesive.

The electrode for an electric double layer capacitor of the present invention which comprises a conductive adhesive layer comprising carbon black, graphite, and binder between the collector sheet and the electrode forming sheet has not fewer than 100,000 dimples having a largest outer diameter in a range of 4 to 10 μm and a depth in a range of 4 to 15 μm formed on the surface of the above-mentioned collector sheet per 1 $cm^2$, the occupied area of the dimples relative to the entire surface area of the collector sheet is not more than 50%, and the peak value in the particle size distribution of the graphite is in a range of 2.6 to 3.2 μm.

The graphite having a peak value in the particle size distribution in a range of 2.6 to 3.2 μm of the present invention can maintain macro conductive paths, and can also improve adhesiveness by desirably entering into the dimples formed on the surface of the collector sheet. In the case in which the peak value in the particle size distribution is below the range, graphite cannot behave as a carbon particle of large diameter any longer, macro conductive paths may be lost, and resistivity of the conductive adhesive may be increased. On the other hand, in the case in which the peak value in the particle size distribution is above the range, contact area among the particles may be reduced, and it may become difficult for graphite to enter into the dimples formed on the surface of the collector sheet, adhesive strength may be deteriorated, and interface separation may easily occur.

In the electrode for an electric double layer capacitor of the present invention having the structure mentioned above, since the peak value in the particle size distribution is in a range of 2.6 to 3.2 μm, macro conductive paths can be desirably maintained, and initial resistance of the cell can be sufficiently restrained. At the same time, since the graphite having the peak value in the particle size distribution mentioned above can enter into the dimples formed on the surface of the collector sheet, adhesive strength is improved compared to before, and as a result, increasing of resistance by aging can be restrained.

The surface characteristics of the collector sheet of the present invention are such that not fewer than 100,000 dimples having a largest outer diameter in a range of 4 to 10 μm and a depth in a range of 4 to 15 μm are formed on the surface per unit area (1 cm²), and the occupied ratio of the area of the dimples to the entirety of the collector sheet is not more than 50%. As the collector sheet of the present invention, various kinds of metallic foil can be used. Generally, aluminum foil is desirable. Particularly in the present invention, aluminum foil in which etching process is performed on the surface is used. This etching process forms fine dimples on the surface, and carbon particles of the conductive adhesive enter into these dimples and adhere strongly, and thus the interface separation of the conductive adhesive and the collector sheet can be restrained. FIG. 1 is a drawing showing such collector sheet and electrode forming sheet joined by the conductive adhesive in the present invention. FIGS. 2 and 3 are electron micrographs showing the aluminum foil used in the present invention. FIG. 2 is an electron micrograph showing the surface of the aluminum foil whose surface is etched, and it is clear that fine dimples are formed. FIG. 3 is an electron micrograph showing a cross section of the aluminum foil in which etching is performed, and the depths of the dimples are shown.

Furthermore, another aspect of an electrode for electric double layer capacitor of the present invention in which a conductive adhesive layer comprising conductive filler and PVA is formed between the collector sheet and the electrode forming sheet is that the saponification value of the PVA is in a range of 90.0 to 98.5.

Generally, PVA is synthesized by a method as follows: vinyl acetate is synthesized by reacting acetic acid and ethylene in the presence of oxygen; vinyl acetate is polymerized to generate polyvinyl acetate; and alkali is added to this polymer to saponify the acetic group ($CH_3COO-$) of polyvinyl acetate into a hydroxyl group (OH). However, in the case in which all the acetic groups are saponified, problems of preservation can be considered since the polymer becomes insoluble in water, and the polymer is easily gelatinized. Therefore, in an actual process for production of PVA, PVA is produced under the conditions shown in Chemical Formula 1 in which the acetic group and the hydroxyl group both exist. The ratio of the hydroxyl group to the total number of both functional groups is defined as the saponification value.

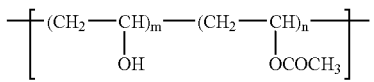

(Chemical Formula 1)

In the conductive adhesive of the present invention having the structure described above, since the saponification value of PVA is in a range of 90.0 to 98.5, the remaining ratio of acetic groups is extremely low, and swelling of the conductive adhesive layer by propylene carbonate (PC) which is an electrolyte can be restrained. As a result, adhesive strength is improved.

By using such conductive adhesive, the collector sheet and the electrode forming sheet are desirably adhered. Furthermore, since water can be used as a solvent, the solvent can be removed by minimal heating during a drying process, and embrittlement of the electrode by heat can be restrained.

Aspects of the present invention are further explained in detail.

It is desirable that the conductive adhesive of the present invention comprise a conductive filler, a binder, and a dispersant. As the conductive filler, carbon based particles such as carbon black or graphite are desirable. Furthermore, it is desirable that conductive carbon particles having large diameter and small diameter both be contained.

Since the carbon particles of large diameters can maintain macro conductive paths, resistivity of the conductive adhesive can be reduced, and initial resistance of a cell can be sufficiently restrained. However, in the case in which only carbon particles of large diameters are used, in spite of the fact that the macro conductive paths can be maintained, adhesive strength and contact area are poor, and separation along the adhering interface may easily occur.

On the other hand, in the case in which only carbon particles of small diameters are used, since the particles can be densely filled, this is desirable from the viewpoints of adhesive strength and contact area. However, if few macro conductive paths are contained, resistivity of the conductive adhesive may increase. Therefore, it is desirable that conductive particles of large diameters and small diameters both be contained.

In the conductive adhesive of the present invention, graphite is added as the carbon particle of large diameter and carbon black is added as the carbon particle of small diameter. It is desirable that the contained ratio be in a range of 30:70 to 70:30, and in the present invention, they are added at a more desirable ratio of 55:45.

Polyvinyl alcohol is added as a binder of the conductive adhesive of the present invention; however, it need not be so limited. Other resins such as polyvinyl acetate, polyacrylic acid ester, copolymer of ethylene vinyl acetate, ionomer resin, polyvinyl butyral, nitro cellulose, styrene butadiene rubber, butadiene acrylonitrile rubber, neoprene rubber, phenol resin, melamine resin, polyurethane resin, urea resin, polyimide resin, or polyamideimide resin can be used.

As a solvent of the conductive adhesive of the present invention, other than water, solvents such as methanol, ethanol, isopropyl alcohol, butanol, trichloroethylene, dimethylformamide, ethylether, or acetone can be used alone or in combination.

In the conductive adhesive of the present invention, carboxymethylcellulose (CMC) is used as a dispersant. This is added to prevent carbon black and graphite, which are conductive fillers from being agglutinated.

Furthermore, the present invention is characterized in that the saponification value of PVA, which is a binder, is in a range of 90.0 to 98.5. PVA generally has acetic groups and hydroxyl groups in its production process as described above. In the case in which this remaining acetic group is contained in large amounts (case of low saponification value), the conductive adhesive layer is swelled by the electrolyte, and separation between the collector sheet and conductive adhesive layer may easily occur. On the other hand, in the case in which the saponification value is above the range, gelatinization may easily occur, and durability is extremely low. Therefore, it is desirable that the saponification value of PVA be in the range of the present invention.

Furthermore, in the present invention, it is desirable that 0.5 to 2.0% of H atoms of hydroxyl groups contained in PVA of the binder be substituted by Si atoms. That is, metals such as aluminum or the like generally form a skin containing hydroxide on its surface, although in the case of the PVA having structure mentioned above, since Si atoms of PVA bond with the hydroxyl group of the skin which is formed on the surface of aluminum foil which is the collector sheet, adhesiveness may be further improved. Therefore, even a PVA having a low saponification value can restrain separation of the conductive adhesive layer and the collector sheet. To obtain such effect, not less than 0.5% of H atoms must be substituted by Si atoms, and the adhesiveness is improved as the substitution ratio of Si is increased. However, in the case in which the ratio of Si substitution is greater than 2.0%, solubility in water may be decreased, and preparation of the adhesive becomes difficult. Therefore, it is desirable that the substitution ratio of H atoms by Si atoms be in a range of 0.5 to 2.0%.

As the collector sheet of the present invention, various kinds of metal can be used, and aluminum foil is generally desirable. Particularly in the present invention, aluminum foil whose surface is etched is used. Carbon particles in the conductive adhesive enter into fine pitting of the surface formed by this etching process to adhere strongly, and thus the interface separation of the conductive adhesive and the collector sheet can be restrained. The collector sheet of the present invention desirably has surface characteristics that not fewer than 100,000 pittings having a diameter in a range of 4 to 10 μm and a depth in a range of 4 to 15 μm are formed on the surface per unit area (1 cm²), and that the occupied ratio of the area of the dimples to the entirety of the collector sheet is not more than 50%.

EXAMPLES

Figure 1:
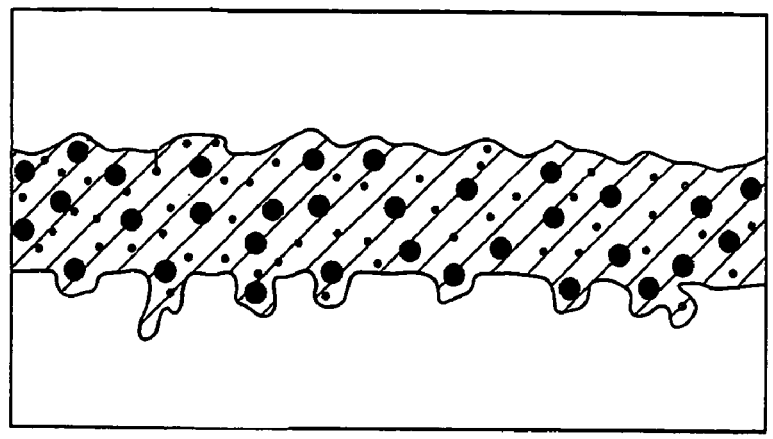
FIG. 1 is a drawing showing a collector sheet and electrode forming sheet joined by a conductive adhesive in the present invention.
Figure 2:
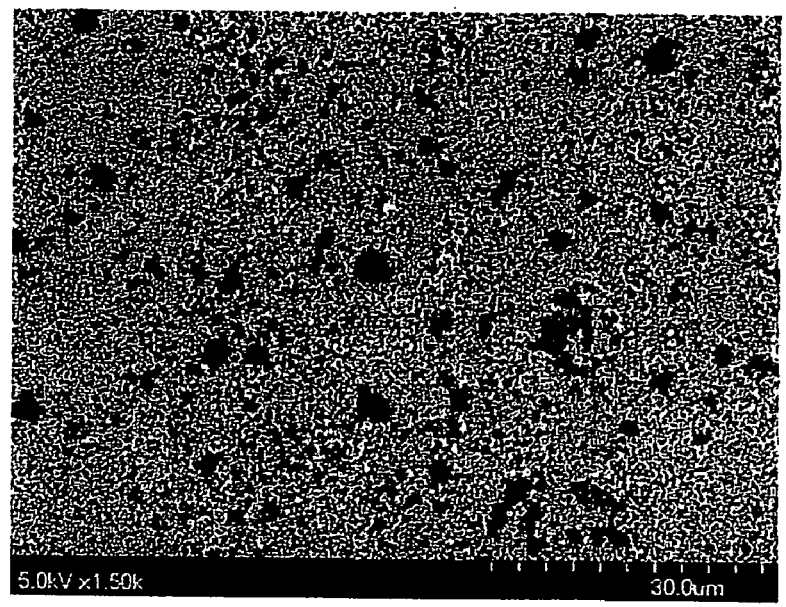
FIG. 2 is an electron micrograph showing a surface of the etched aluminum foil of an Example.
Figure 3A:
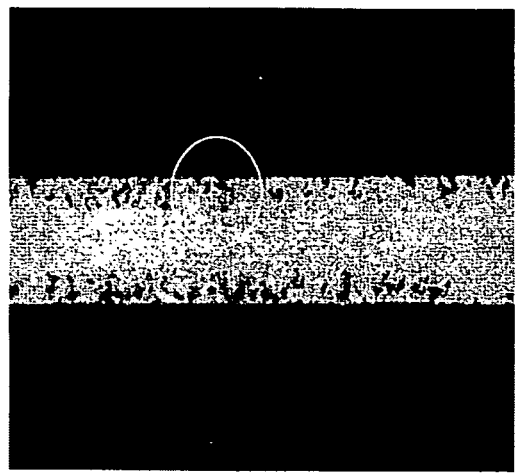
FIG. 3 is an electron micrograph showing a cross section of the etched aluminum foil of an Example.
Figure 3B:
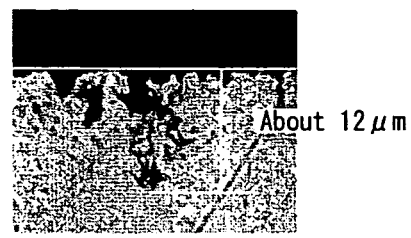

The present invention is further explained by way of Examples. However, the present invention is not limited thereto.

Example 1

1. Measurement of Particle Size Distribution of Graphite

To prepare electric double layer capacitors in which the diameter of graphite used is varied, particle size distributions of graphite were measured first. 0.1 g of Samples (graphite) A to J were added to a solvent in which 10 g of isopropyl alcohol and 10 g of water were mixed, dispersed uniformly by ultrasonic waves of 38 kHz for 10 minutes, and the particle size distribution was measured by a microtrac particle size analyzer (trade name: HRA MODEL 9320-X100, produced by NIKKISO Co., Ltd.). Measurement was performed three times per Sample, 30 seconds each time. The average value of the obtained data was measured.

The peak values of the particle size distributions of Samples A to J of the above-mentioned measured Sample (graphite) were 2.0 μm, 2.3 μm, 2.5 μm, 2.8 μm, 3.0 μm, 3.2 μm, 3.5 μm, 4.0 μm, 5.0 μm, and 10.0 μm. These Samples were used as raw materials of conductive adhesives A to J.

2. Mixing of Conductive Adhesive

The following raw materials were mixed and blended to obtain conductive adhesive of Examples. It should be noted that the graphite used in the conductive adhesives A to J was the graphite having a peak value of particle size distribution in a range of 2.0 to 10.0 μm mentioned in the measurement above.

Polyvinyl alcohol (trade name: Kuraray Poval R-1130, produced by KURARAY Co., Ltd.): 3 weight %
Carbon black (particle diameter 0.2 μm, produced by DENKI KAGAKU KOGYO K. K.): 10 weight %
Graphites A to J (particle diameter 2.0 to 10 μm, produced by NIPPON GRAPHITE INDUSTRIES, Ltd.): 10 weight %
Carboxymethylcellulose (dispersant, produced by DAI-ICHI KOGYO SEIYAKU Co., Ltd.): 3 weight %
Pure water: 74 weight %

3. Preparation of Electrode Forming Sheet

The following raw materials were mixed and blended to disperse the raw material powder uniformly. The mixture was put in a kneading device, a combining process by double axes was performed for 10 minutes under conditions of 0.5±0.05 MPa, to obtain a solid material. The solid material was pulverized to obtain pulverized powder. The pulverized powder was applied to pre-sheet forming by using calender rolling. The thickness of the sheet was controlled by a rolling process using a rolling roll, to obtain the electrode forming sheet of Example.

Activated carbon powder (trade name: KH-1200, produced by KUREHA CHEMICAL INDUSTRIES Co., Ltd.): 80 weight %
Conductive carbon (trade name: Denkablack, produced by DENKI KAGAKU KOGYO K. K.): 10 weight %
PTFE resin (trade name: Teflon (trade mark) 6J, produced by DU PONT-MITSUI FLUOROCHEMICALS CO., LTD.): 10 weight %

4. Preparation of Electrode

The above-mentioned conductive adhesive A was coated on the surface of a long etched aluminum foil (trade name: ED-402H, produced by NIPPON CHEMI-CON CORPORATION) by a gravure roller, the above-mentioned electrode forming sheets was joined with the aluminum foil and pressed by a roll press at a nip pressure of 0.1 MPa. This sheet was dried by vacuum drying at 160° C. for 12 hours to obtain electrode A of an Example. Furthermore, except that conductive adhesives B to J were used instead of conductive adhesive A, electrodes B to J of Examples were prepared in the same way as described above.

5. Evaluation of Examples

When electric double layer capacitors are used connected in series in a car, deterioration of efficiency of charge and discharge over time is undesirable. Therefore, durability tests of single cells of the electric double layer capacitor in which each electrodes A to J of the Examples were used was performed. The durability test was performed by applying 2.5 V for 2000 hours at 45° C. Initial resistance of each single cell and measured results of increased ratio of resistance after the durability test are shown in Table 1. Values of initial resistance are not actual values, but minimum values among electrodes A to J defined as 100, and relative values are shown. Similarly, values of resistance after durability tests are also relative values to the values of initial resistance which is defined as 100.

TABLE 1

| | Peak value in the particle size distribution of graphite (μm) | Cell resistance (initial) | Cell resistance (after 1000 hours) |
|---|---|---|---|
| Electrode A | 2.0 | 150 | — |
| Electrode B | 2.3 | 110 | — |
| Electrode C | 2.5 | 105 | — |
| Electrode D | 2.8 | 100 | 110 |
| Electrode E | 3.0 | 100 | 110 |
| Electrode F | 3.2 | 100 | 110 |
| Electrode G | 3.5 | 100 | 120 |
| Electrode H | 4.0 | 100 | 135 |
| Electrode I | 5.0 | 100 | 145 |
| Electrode J | 10.0 | 100 | — |

High initial resistance was observed in the case of electrodes A to C. It is thought that macro conductive paths were not formed since the particle diameters of the graphite were too small. Resistance increase after the durability test was extreme in the case of electrodes G to I. It is thought that adhesive strength with the collector sheet was insufficient, and separation occurred along the joining interface since the particle diameters of graphite were too large. Similarly, in the case of electrode J, it is thought that adhesive strength with the collector sheet was insufficient, and separation occurred along the joining interface after the durability test since the particle diameters of graphite were too large.

Figure 4:
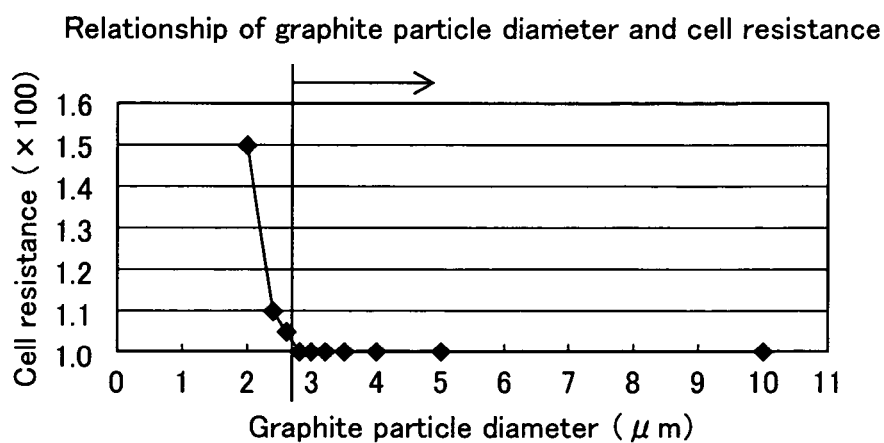
FIG. 4 is a graph showing the relationship of graphite particle diameter (peak value in the particle distribution) and the cell resistance of an Example.

FIG. 4 is a graph showing the relationship of graphite diameter (peak value in the particle distribution) contained in the electric double layer capacitor of the Examples and the cell initial resistance of Examples. As is described above, efficient initial resistance can be exhibited since macro conductive paths can be maintained when the particle diameters of graphite are large. In the present invention, it can be said that diameters not less than 2.6 μm are desirable.

Figure 5:
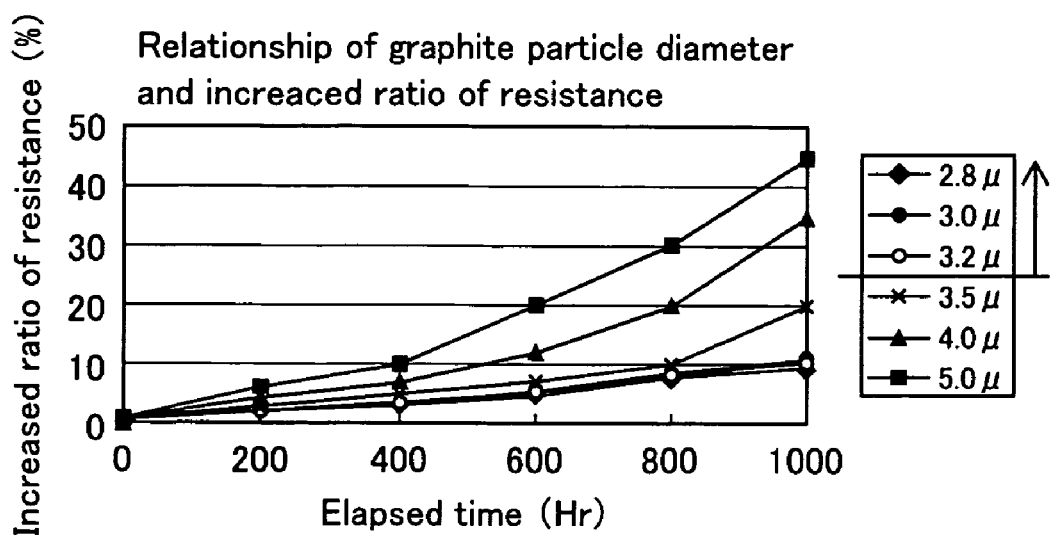
FIG. 5 is a graph showing the relationship of graphite particle diameter (peak value in the particle distribution) and the increased ratio of resistance of an Example.

FIG. 5 is a graph showing the relationship of graphite diameter (peak value in the particle distribution) contained in the electric double layer capacitor of the Examples and the increased ratio of resistance over time of the durability test. As is described above, it is obvious that the increased ratio of resistance can be restrained since the graphite enters into dimples of the collector sheet to adhere strongly when the diameters of the graphite are small. In the present invention, it can be said that a diameter of not more than 3.2 μm is desirable.

Example 2

1. Preparation of Conductive Adhesive 3 parts by weight of polyvinylalcohol having a saponification value of 98.5, 10 parts by weight of carbon black (trade name: Denkablack, produced by DENKI KAGAKU KOGYO K.K.), 10 parts by weight of graphite (trade name: SP-300, produced by NIPPON GRAPHITE INDUSTRIES, Ltd.), 3 parts by weight of carboxymethylcellulose (trade name: Celogen F-3H, produced by DAI-ICHI KOGYO SEIYAKU Co., Ltd.), and 74 parts by weight of pure water were mixed and agitated to obtain the conductive adhesive of Example 2.

2. Preparation of Electrode Forming Sheet 80 parts by weight of activated carbon powder (trade name: KH-1200, produced by KUREHA CHEMICAL INDUSTRIES Co., Ltd.), 10 parts by weight of conductive carbon (trade name: Denkablack, produced by DENKI KAGAKU KOGYO K. K.), and 10 parts by weight of PTFE resin (trade name: Teflon (trade mark) 6J, produced by DU PONT-MITSUI FLUOROCHEMICALS Co., Ltd.) were mixed and agitated to disperse the raw material powder uniformly. The mixture was put in a kneading device, a combining process by double axes was performed for 10 minutes under conditions of 0.5±0.05 MPa, to obtain a solid material. This solid material was pulverized to obtain pulverized powder. This pulverized powder was applied to pre-sheet forming by using calender roll. The thickness of the sheet was controlled by a rolling process using a rolling roller, to obtain the electrode forming sheet.

3. Preparation of Electrode

The above-mentioned conductive adhesive was coated on the surface of a long etched aluminum foil (trade name: ED-402H, produced by NIPPON CHEMI-CON CORPORATION) by a gravure roll, the above-mentioned electrode forming sheets was joined with the aluminum foil and pressed by a roll press. This sheet was dried by vacuum drying at 160° C. for 72 hours to obtain an electrode.

Next, electrodes of Examples 3 to 7 and Comparative Examples 1 to 6 were prepared in the conditions described below.

Example 3

Except that the saponification value of polyvinylalcohol was 95, electrode was prepared in the same way as in Example 2.

Example 4

Except that the saponification value of polyvinylalcohol was 92, electrode was prepared in the same way as in Example 2.

Example 5

Except that the saponification value of polyvinylalcohol was 90, electrode was prepared in the same way as in Example 2.

Comparative Example 1

Except that the saponification value of polyvinylalcohol was 88, electrode was prepared in the same way as in Example 2.

Comparative Example 2

Except that the saponification value of polyvinylalcohol was 85, electrode was prepared in the same way as in Example 2.

Comparative Example 3

Except that the saponification value of polyvinylalcohol was 80, electrode was prepared in the same way as in Example 2.

Comparative Example 4

Except that the saponification value of polyvinylalcohol was 99, electrode was prepared in the same way as in Example 2. However, durability was poor and gelatinization occurred, making it impossible to prepare an electrode.

Example 6

Except that polyvinylalcohol in which the saponification value was 92 and 2% of H atoms was substituted by Si atoms was used instead of polyvinylalcohol having a saponification value of 98.5, electrode was prepared in the same way as in Example 2.

Example 7

Except that polyvinylalcohol in which the saponification value was 90 and 2% of H atoms was substituted by Si atoms was used instead of polyvinylalcohol having a saponification value of 98.5, electrode was prepared in the same way as in Example 2.

Comparative Example 5

Except that polyvinylalcohol in which the saponification value was 88 and 2% of H atoms was substituted by Si atoms was used instead of polyvinylalcohol having the saponification value of 98.5, electrode was prepared in the same way as in Example 2.

Comparative Example 6

Except that polyvinylalcohol in which the saponification value was 85 and 2% of H atoms was substituted by Si atoms was used instead of polyvinylalcohol having a saponification value of 98.5, electrode was prepared in the same way as in Example 2.

Evaluation of Examples 2 to 7 and Comparative Examples 1 to 6

Figure 6:
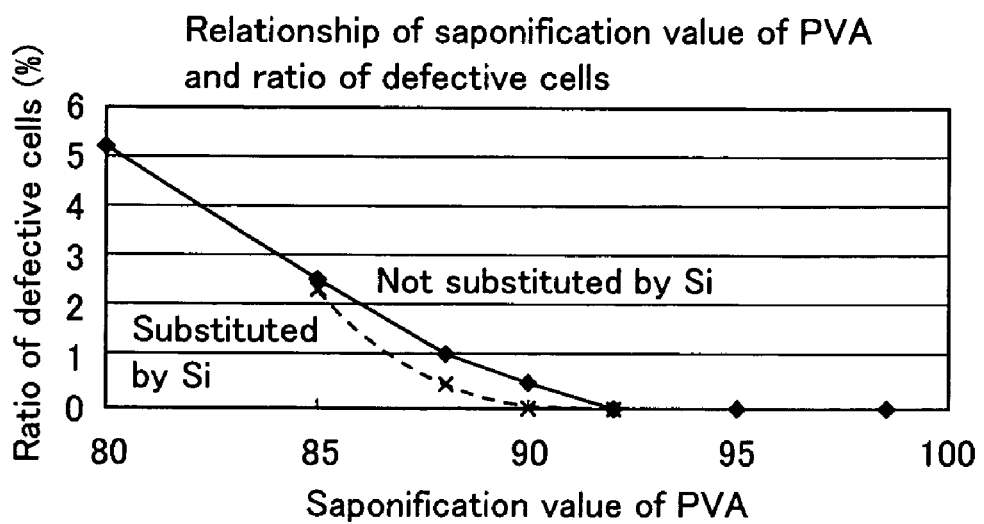
FIG. 6 is a graph showing the relationship of the saponification value of PVA and the fraction of defective of cells of the electrode for electric double layer capacitor of an Example.

When an electric double layer capacitor is used connected in series in a car, deterioration of efficiency of charge and discharge over time is undesirable. Therefore, durability tests of single cells of the electric double layer capacitor in which each electrode of Examples 2 to 7 and Comparative Examples 1 to 6 were used was performed. The durability test was performed by applying 2.5 V for 2000 hours at 45° C. After the test, a cell in which increased ratio of resistance to initial resistance was less than 20% was evaluated as non-defective, and a cell in which the increased ratio was not less than 20% was evaluated as defective. Results are shown in FIG. 6. It is obvious that PVA in which H atoms of the hydroxyl group are substituted by Si atoms can restrain rate of defective cells even if the saponification value of the PVA is low. It is thought that this is because Si atoms bond to hydroxyl groups of the surface of the aluminum.

As explained above, the present invention has not less than 100,000 dimples having a largest outer diameter in a range of 4 to 10 μm and a depth in a range of 4 to 15 μm are formed on the surface of the collector sheet per 1 $cm^2$, the occupied area of the dimples to the entire surface area of the collector sheet is not more than 50%, and the peak value in the particle size distribution of the graphite is in a range of 2.6 to 3.2 μm. By this invention, electrodes for electric double layer capacitor in which initial resistance can be sufficiently restrained and increase of resistance over time can be restrained can be provided.

Furthermore, by improving adhesiveness of the collector sheet and the electrode forming sheet of electric double layer capacitor in which PVA is used as a resin component of conductive adhesive, electrode for electric double layer capacitor in which increase of resistance can be restrained can be provided.

What is claimed is:

1. An electrode for an electric double layer capacitor, comprising:
    a collector sheet;
    an electrode forming sheet;
    a conductive adhesive layer comprising conductive filler and polyvinylalcohol between the collector sheet and the electrode forming sheet; and
    a saponification value of the polyvinylalcohol in a range from 90.0 to 98.5.

2. The electrode for electric layer capacitor according to claim 1, wherein 0.5 to 2.0% of hydrogen of hydroxyl groups contained in the polyvinylalcohol is substituted by silicon.

* * * * *